(12) United States Patent
Zhang (10) Patent No.: US 11,172,462 B2
(45) Date of Patent: Nov. 9, 2021

(54) WIRELESS COMMUNICATION METHODS AND NETWORK AND TERMINAL DEVICES

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/872,304

(22) Filed: May 11, 2020

(65) Prior Publication Data

US 2020/0275405 A1 Aug. 27, 2020

Related U.S. Application Data

(63) Continuation of application No. PCT/CN2017/110969, filed on Nov. 14, 2017.

(51) Int. Cl.
*H04W 68/00* (2009.01)
*H04W 4/029* (2018.01)
(Continued)

(52) U.S. Cl.
CPC ......... *H04W 68/005* (2013.01); *H04W 4/029* (2018.02); *H04W 4/06* (2013.01);
(Continued)

(58) Field of Classification Search
CPC ..... H04W 68/005; H04W 4/029; H04W 4/06; H04W 56/001; H04W 72/042;
(Continued)

(56) References Cited

U.S. PATENT DOCUMENTS

2010/0222083 A1 9/2010 Kazmi
2015/0173041 A1 6/2015 Kazmi et al.
(Continued)

FOREIGN PATENT DOCUMENTS

CN 102740459 A 10/2012
CN 102821358 A 12/2012
(Continued)

OTHER PUBLICATIONS

Written Opinion of the International Search Authority in the international application No. PCT/CN2017/110969, dated Jul. 30, 2018.
(Continued)

*Primary Examiner* — Nam T Huynh
(74) *Attorney, Agent, or Firm* — Perkins Coie LLP (57) ABSTRACT

Provided in an embodiment of the present invention are a radio communication method and device capable of realizing paging or transmission of a broadcast message in an NR system. The method comprises: a network device determining N first time locations to be occupied for performing paging or transmitting a broadcast message at a specific frequency point with respect to a terminal device, N being an integer greater than or equal to 1; and the network device performing paging or transmitting the broadcast message at the specific frequency point at the N first time locations with respect to the terminal device.

20 Claims, 6 Drawing Sheets

(51) Int. Cl.
*H04W 4/06* (2009.01)
*H04W 56/00* (2009.01)
*H04W 72/04* (2009.01)

(52) U.S. Cl.
CPC ....... *H04W 56/001* (2013.01); *H04W 72/042* (2013.01); *H04W 72/0446* (2013.01)

(58) Field of Classification Search
CPC ... H04W 72/0446; H04W 4/70; H04W 68/02; H04W 68/00; H04W 16/28
See application file for complete search history.

(56) References Cited

U.S. PATENT DOCUMENTS

| | | | |
|---|---|---|---|
| 2015/0341973 | A1 | 11/2015 | El-Hoiydi et al. |
| 2016/0338007 | A1 | 11/2016 | Kazmi et al. |
| 2017/0311283 | A1 | 10/2017 | Kazmi et al. |
| 2018/0295605 | A1 | 10/2018 | Kazmi et al. |
| 2019/0349888 | A1 | 11/2019 | Kazmi et al. |
| 2019/0357170 | A1* | 11/2019 | Liu ................ H04W 48/12 |
| 2020/0059873 | A1* | 2/2020 | Takeda ............ H04L 27/2666 |

FOREIGN PATENT DOCUMENTS

| | | |
|---|---|---|
| CN | 103139880 A | 6/2013 |
| CN | 103874009 A | 6/2014 |
| CN | 106793058 A | 5/2017 |
| WO | 2008022782 A1 | 2/2008 |
| WO | 2014094877 A1 | 6/2014 |
| WO | 2015154296 A1 | 10/2015 |
| WO | 2017079574 A1 | 5/2017 |
| WO | 2017176438 A1 | 10/2017 |

OTHER PUBLICATIONS

Intel Corporation, NR Paging Design, Discussion and Decision, 3GPP TSG RAN WG1 Meeting #90bis R1-1717356, Oct. 9-13, 2017.

Samsung, Paging design, Discussion and Decision, 3GPP TSG RAN WG1 Meeting 90bis R1-1717580, Oct. 9-13, 2017.

Samsung: "RAN2 aspects of high frequency New RAT", 3GPP Draft; R2-162251, 3rd Generation Partnership Project (3GPP), Mobilecompetence Centre; 650, Route Des Lucioles; F-06921 Sophia-Antipolis Cedex France vol. RAN WG2, no. Dubrovnik, Croatia; Apr. 11, 2016-Apr. 15, 2016Apr. 1, 2016 (Apr. 1, 2016), XP051082025.

Supplementary European Search Report in the European application No. 17931956.1, dated Oct. 16, 2020.

International Search Report in the international application No. PCT/CN2017/110969, dated Jul. 30, 2018.

3GPP TSG RAN WG1 Meeting NR#3 R1-1715912, Nagoya, Japan, Sep. 17-18, 2017; Source: Samsung Title: Paging design. 5 pages.

First Office Action of the Chinese application No. 202010470642.3, dated Jun. 17, 2021. 14 pages with English translation.

Office Action of the Indian application No. 202027024603, dated Jun. 22, 2021. 6 pages with English translation.

First Office Action of the Korean application No. 10-2020-7016991, dated Jun. 29, 2021. 11 pages with English translation.

3GPP TSG-RAN WG1 Meeting #88-bis R1-1706013, Spokane, US, Apr. 3-7, 2017; Agenda Item: 8.1 1.3; Source Ericsson; Title: On NR paging design. 4 pages.

First Office Action of the European application No. 17931956.1, dated Jul. 14, 2021. 7 pages.

* cited by examiner

WIRELESS COMMUNICATION METHODS AND NETWORK AND TERMINAL DEVICES

CROSS-REFERENCE TO RELATED APPLICATIONS

The application is a continuation application of PCT Application No. PCT/CN2017/110969 filed on Nov. 14, 2017, the disclosure of which is hereby incorporated by reference herein in its entity.

BACKGROUND

In a Long Term Evolution (LTE) system, a network device and a terminal device may determine, in a paging cycle, a Paging Occasion (PO) during which the network device pages the terminal device.

In a future New Radio (NR) system, how to page the terminal device is a problem to be solved urgently.

SUMMARY

The application relates to the field of communication, and more particularly to a wireless communication method and device.

A first aspect provides a wireless communication method, which may include the following operations. A network device determines N first time locations required to be used for paging a terminal device or transmitting a broadcast message to the terminal device at a specific frequency point, the specific frequency point being configured to represent a frequency point at which communication with the terminal device is performed, and N being an integer greater than or equal to 1. The network device pages the terminal device or transmits the broadcast message to the terminal device at the specific frequency point at the N first time locations.

A second aspect provides a wireless communication method, which may include the following operations. A terminal device determines N first time locations used for the network device to page the terminal device or transmit the broadcast message to the terminal device at the specific frequency point, the specific frequency point being configured to represent a frequency point at which communication with the terminal device is performed, and N being an integer greater than or equal to 1. The terminal device monitors paging performed by the network device or the broadcast message transmitted by the network device at the specific frequency point at the N first time locations.

A third aspect provides a network device, including a processor and an output interface. The processor is configured to: determine N first time locations required to be used for paging a terminal device or transmitting a broadcast message to the terminal device at a specific frequency point, the specific frequency point being configured to represent a frequency point at which communication with the terminal device is performed, and N being an integer greater than or equal to 1; and page the terminal device or transmit the broadcast message to the terminal device, through the output interface, at the specific frequency point at the N first time locations.

A fourth aspect provides a terminal device, including a processor and a network interface. The processor is configured to determine N first time locations used for a network device to page the terminal device or transmit a broadcast message to the terminal device at a specific frequency point, the specific frequency point being configured to represent a frequency point at which communication with the terminal device is performed, and N being an integer greater than or equal to 1; and the network interface is configured to monitor paging performed by the network device or the broadcast message transmitted by the network device at the specific frequency point at the N first time locations.

BRIEF DESCRIPTION OF THE DRAWINGS

In order to more clearly illustrate technical solutions in embodiments of the disclosure, the accompanying drawings needed in description of the embodiments or the conventional art are simply introduced below. It is apparent that the accompanying drawings in the following description are only some embodiments of the disclosure, for the ordinary skill in the art, some other accompanying drawings can also be obtained according to these on the premise of not contributing creative effort.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
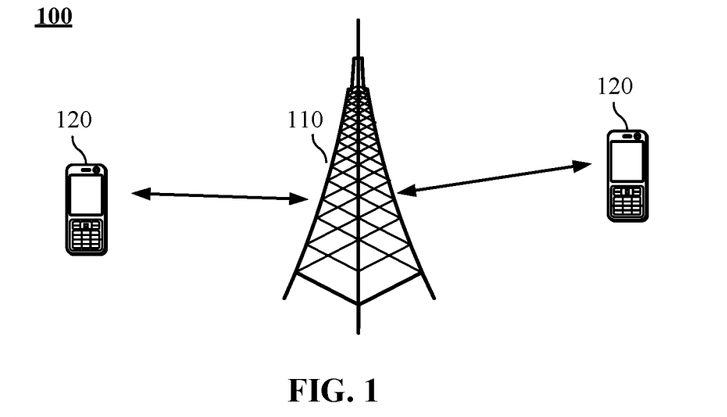
FIG. 1 is a schematic diagram of a wireless communication system according to an embodiment of the disclosure.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. According to an implementation, the network device 100 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal device 120 may be mobile or fixed. According to an implementation, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

According to an implementation, the terminal device 120 may perform Device to Device (D2D) communication.

According to an implementation, the 5G system or network may also be called a New Radio (NR) system or network.

A network device and two terminal devices are exemplarily shown in FIG. 1. According to an implementation, the wireless communication system 100 may include multiple network devices and another number of terminal devices may be included in coverage of each network device. There are no limits made thereto in the embodiments of the disclosure.

According to an implementation, the wireless communication system 100 may further include another network entity such as a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 2:
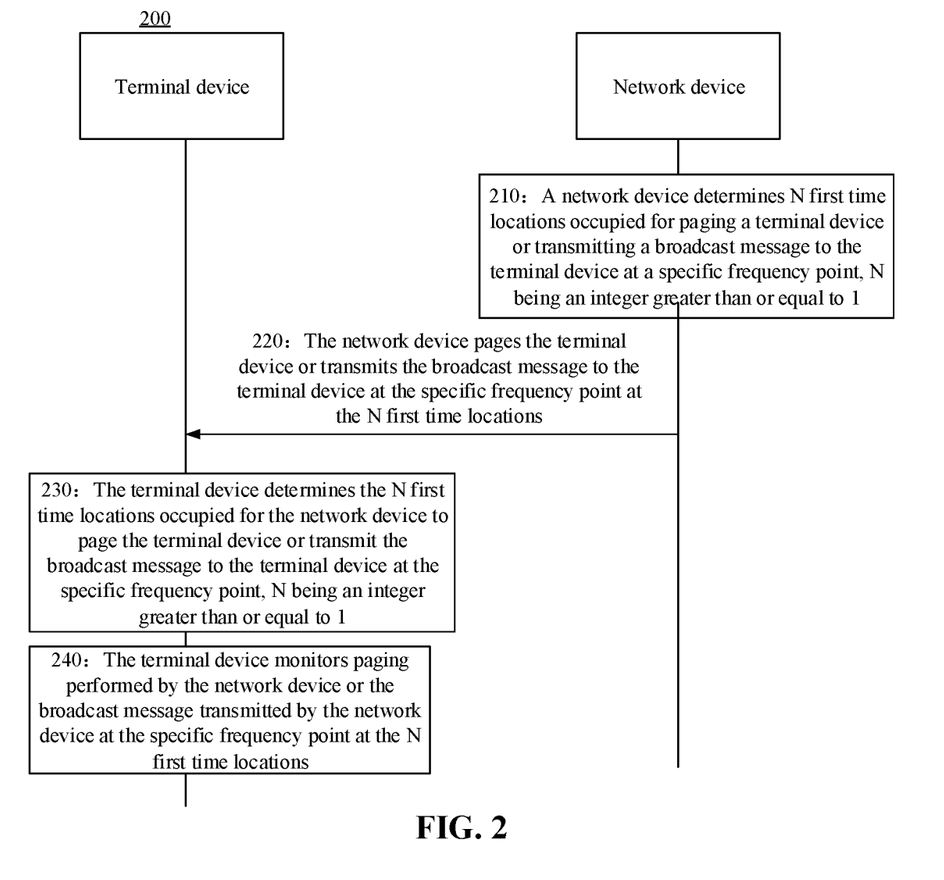
FIG. 2 is a schematic flowchart of a wireless communication method according to an embodiment of the disclosure.

FIG. 2 is a schematic flowchart of a wireless communication method 200 according to an embodiment of the disclosure. According to an implementation, the method 200 may be applied to, but not limited to, the system illustrated in FIG. 1. The method 200 includes at least a part of the following contents.

At S210, a network device determines N first time locations required to be occupied for paging a terminal device or transmitting a broadcast message to the terminal device at a specific frequency point, N being an integer greater than or equal to 1.

According to an implementation, at the different first time locations, different transmission beams are used to page the terminal device or transmit the broadcast message.

According to an implementation, when the first time locations are used for paging, a PDCCH and/or a PDSCH for paging the terminal device to the terminal device is transmitted at each of the N first time locations.

According to an implementation, the N first time locations correspond to a full beam scan.

According to an implementation, the time location mentioned in the embodiments of the disclosure may include at least one symbol. When the time location includes multiple symbols, the multiple symbols may be consecutive.

According to an implementation, the number of symbols included in the N first time locations may be the same or different.

According to an implementation, each time location corresponds to a single beam scan, and the different time locations for paging once or transmitting the broadcast message may correspond to different beams.

According to an implementation, the operation that the network device pages the terminal device may be that the PDCCH and/or the PDSCH for paging is transmitted at the corresponding time location.

According to an implementation, the broadcast message mentioned in the embodiments of the disclosure may bear RMSI, OSI or on-demands system information.

According to an implementation, when paging is performed, one time location mentioned in the embodiments of the disclosure may be used for bearing the PDSCH and the PDCCH of frequency division multiplexing; or, the different symbols of one time location are used for bearing the PDSCH and the PDCCH, respectively; or, one time location is only used for bearing the PDCCH or the PDSCH; or, the PDSCH occupies multiple symbols of one time location, and the PDCCH and the PDSCH are multiplexed in a frequency division multiplexing manner on at least a part of the multiple symbols.

According to an implementation, when the embodiments of the disclosure are used for paging, and before the network device determines N first time locations for paging the terminal device to the terminal device at a specific frequency point, the network device determines a PO of paging the terminal device; and N time locations are determined within the PO.

According to an implementation, the PO mentioned in the embodiment of the disclosure may be used for transmitting the PDSCH and/or the PDCCH.

Herein, if the PO is used for transmitting the PDSCH and the PDCCH, the PDSCH and the PDCCH may be transmitted at the same time location (occupying the same symbol), and then, the PDSCH and the PDCCH may be multiplexed in the frequency division multiplexing manner.

Or, if the PO is used for transmitting the PDSCH and the PDCCH, the PDSCH and the PDCCH may be transmitted at the different time locations. For example, the PDCCH may be transmitted first through multiple beams, and then the PDSCH is transmitted through multiple beams. For example, the PDCCH or the PDSCH may be transmitted once on different symbols through the same or different beams, and then, the PDCCH or the PDSCH may be transmitted once on other different symbols through the same or different beams, and so on.

According to an implementation, when monitoring paging, the terminal device may attempt to receive, in its paging cycle, a paging message at a specific sub-frame (called PO) of a specific frame. The PO may be a sub-frame, and on the sub-frame, there may be the PDCCH scrambled with a Paging RNTI Radio Network Temporary Identity (P-RNTI) to and indicating the paging message. When Discontinuous Reception (DRX) is used, the terminal device may need to detect just one PO in each DRX cycle, that is, with respect to each terminal device, there may be only one sub-frame for transmitting the paging message in each paging cycle. The DRX cycle may be identical to the paging cycle. A Paging Frame (PF) may be a radio frame, and the frame may include one or more POs.

According to an implementation, when the first time locations are used for paging, the N first time locations are determined according to identification information of the terminal device.

Specifically, the paging cycle or the PO may be determined according to the identification information of the terminal device. Determining the paging cycle or the PO may also refer to other factors. There are no limits made thereto in the embodiments of the disclosure.

It should be understood that the PO introduced above is only a specific implementation of the disclosure, and for facilitating the understanding of the disclosure, should not form a specific limit to the scope of the disclosure.

According to an implementation, the specific frequency point mentioned in the embodiment of the disclosure may a certain frequency point at which communication with the terminal device is performed.

According to an implementation, during network transmission, a specific pattern may be pre-determined with a terminal; or different patterns are pre-determined for different frequency bands; or centralized patterns are predetermined, and then the terminal is informed of which pattern is to be used, through system information.

At S220, the network device pages the terminal device or transmits the broadcast message to the terminal device at the specific frequency point at the N first time locations.

At S230, the terminal device determines the N first time locations occupied for the network device to page the terminal device or transmit the broadcast message to the terminal device at the specific frequency point, N being an integer greater than or equal to 1.

According to an implementation, when the first time locations are used for paging, the N first time locations are determined according to the identification information of the terminal device.

At S240, the terminal device monitors paging performed by the network device or the broadcast message transmitted by the network device at the specific frequency point at the N first time locations.

For a clearer understanding of the disclosure, several ways of determining N first time locations are introduced below. Herein, some of the following ways are related to the transmission of the SSB. In order to facilitate the understanding, the transmission of the SSB is elaborated below.

The SSB is transmitted periodically. In an SSB cycle, an SS burst set of the specific frequency point may be limited in a time window of 5 ms, the maximum number of SSBs is L.

For a frequency domain range less than or equal to 3 GHz, L is equal to 4.

For a frequency domain range from 3 GHz to 6 GHz, L is equal to 8.

For a frequency domain range from 6 GHz to 52.6 GHz, L is equal to 64.

In the time window of 5 ms, for different sub-carrier intervals and different working frequency bands, time slot distribution of the SSBs may be illustrated in FIG. 2.

Figure 3:
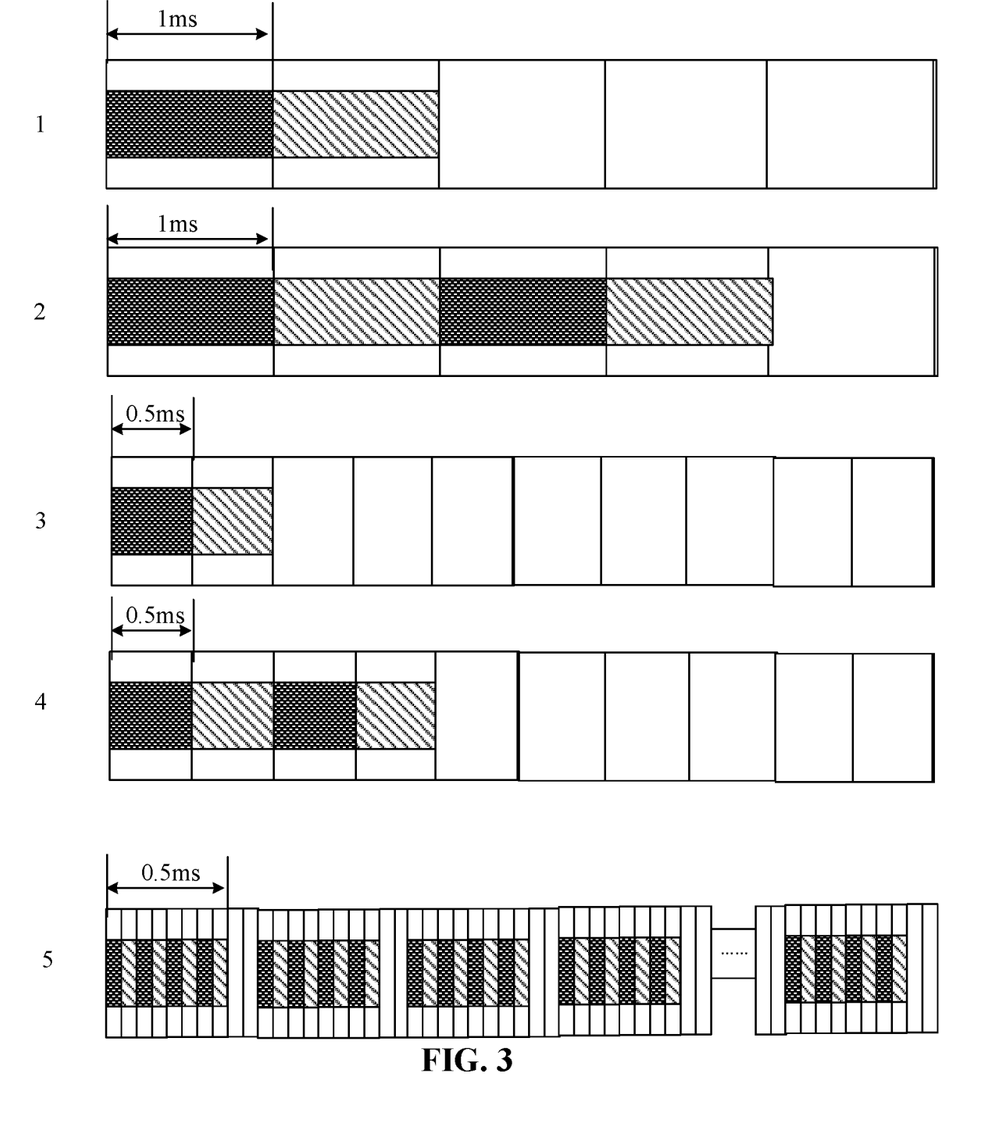
FIG. 3 is a distribution diagram of time slots of SSBs according to an embodiment of the disclosure.

The first row of FIG. 3 illustrates the time slot distribution of the SSBs when the sub-carrier interval is 15 KHZ and L is equal to 4. The second row of FIG. 3 illustrates the time slot distribution of the SSBs when the sub-carrier interval is 15 KHZ and L is equal to 8. The third row of FIG. 3 illustrates the time slot distribution of the SSBs when the sub-carrier interval is 30 KHZ and L is equal to 4. The fourth row of FIG. 3 illustrates the time slot distribution of the SSBs when the sub-carrier interval is 30 KHZ and L is equal to 8. The fifth row of FIG. 3 illustrates the time slot distribution of the SSBs when the sub-carrier interval is 240 KHZ and L is equal to 64.

Figure 4:
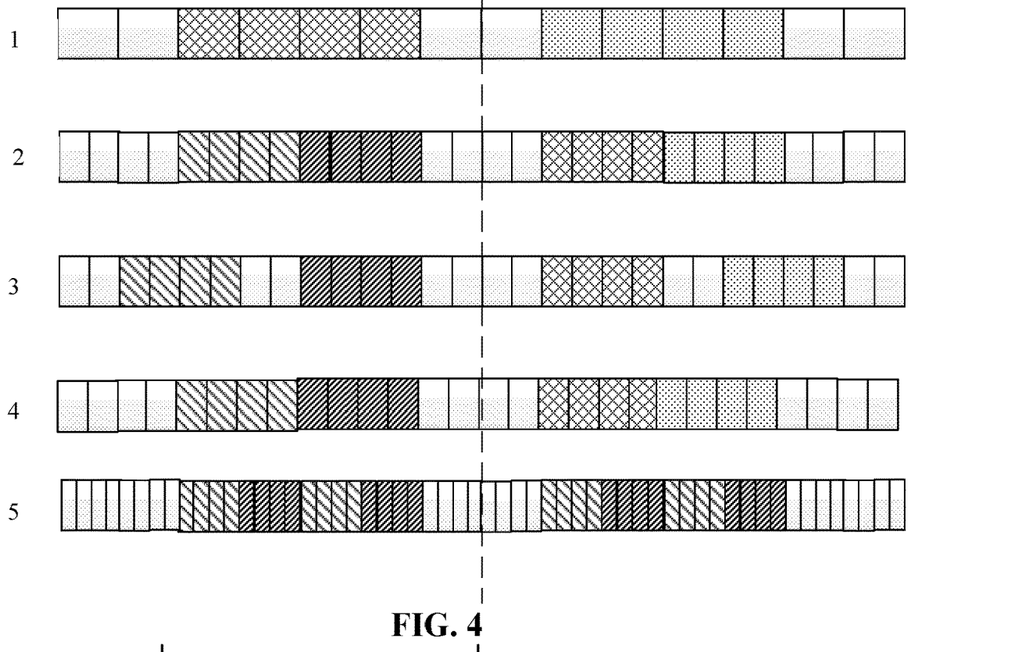
FIG. 4 is a distribution diagram of SSBs in a time slot according to an embodiment of the disclosure.

FIG. 4 illustrates a pattern distribution in a time slot when the sub-carrier interval is 15 KHZ, 30 KHZ, 120 KHZ and 240 KHZ.

As illustrated in FIG. 4, when the sub-carrier interval is 15 KHZ and 30 KHZ, at least one or two symbols at the start of 14 symbols are reserved for downlink control, and at least two symbols at the end are reserved for, for example, guard interval or uplink control.

When the sub-carrier interval is 120 KHZ, at least two symbols at the start of 14 symbols are reserved for downlink control, and at least two symbols at the end are reserved for, for example, guard interval or uplink control.

When the sub-carrier interval is 240 KHZ, across two consecutive time slots, at least four symbols at the start of the first time slot are reserved for downlink control, and at least four symbols at the end of the second time slot are reserved for, for example, guard interval or uplink control.

According to an implementation, the network device or the terminal device determines the N first time locations according to a first pattern, the first pattern being identical to a second pattern, and the second pattern being used for indicating the candidate time locations or the actual transmission time locations of the SSBs at the specific frequency point.

Specifically, the network device or the terminal device determines the N first time locations according to at least one of the following elements indicated by the first pattern: a number of the time locations used for signal transmission, a time length occupied by the time locations used for signal transmission, and an allocation of the time locations used for signal transmission.

According to an implementation, N is equal to the number of the second time locations of the synchronous signal which is transmitted by the network device to the terminal device at the specific frequency point in a full beam scan, and the parameter setting of the beam used for paging the terminal device or transmitting the broadcast message at the N first time locations is consistent with the parameter setting of the beam used for transmitting the SSB at the same number of second time locations.

According to an implementation, the time length mentioned in the embodiment of the disclosure may be represented by the number of symbols. The time length mentioned in the disclosure may be either the time length occupied by a single beam scan or the time length occupied by a full beam scan (including a plurality of beams).

According to an implementation, with respect to a downlink beam (or, a time location), the time length of performing paging or transmitting the broadcast message may be the time length corresponding to 2 symbols, 4 symbols, 7 symbols or one time slot.

According to an implementation, an interval between the time locations mentioned in the embodiment of the disclosure may be an interval between central symbols of two time locations, or an interval between the first symbols of two time locations and an interval between the last symbols of two time locations, or an interval between the last symbol of the previous time location and the first symbol of the next time location.

According to an implementation, the time length of the first time locations is less than or equal to the time length occupied by the time locations indicated by the first pattern.

According to an implementation, an interval between adjacent two first time locations of the N first time location is equal to an interval between adjacent two time locations indicated by the first pattern.

According to an implementation, N is equal the number of the time locations indicated by the first pattern.

According to an implementation, the network device or the terminal device determines the N first time locations according to the candidate time locations or the actual transmission time locations of the SSBs.

Specifically, the N first time locations are determined according to a predetermined relationship between N second time locations and the N first time locations, the N second time locations being the candidate time locations or the actual transmission time locations of the SSBs.

According to an implementation, the time length of the first time locations is less than or equal to the time length occupied by the first time locations.

According to an implementation, an interval between two adjacent first time locations of the N first time locations is equal to an interval between adjacent two second time locations.

An elaboration is given below by taking the case where the sub-carrier interval is 15 KHz and L is equal to 4 as an example.

Specifically, the positions of performing paging or transmitting the broadcast message refer to candidate positions of the maximum number L=4 of SSBs. With respect to each candidate position, occupied symbol positions of possible paging messages of 2 symbols, 4 symbols or 7 symbols are illustrated in FIG. 5.

If the respective SSBs are transmitted, the paging message or the broadcast message corresponding to the SSBs are transmitted correspondingly. Or else, if the SSB at a certain position is not transmitted, the paging message or the broadcast message is not transmitted correspondingly at the position. For example, as illustrated in FIG. 6, if the SSBs at the first position and the fourth position are transmitted, paging is performed or the broadcast message is transmitted to the terminal at the first position and the fourth position.

Figure 5:
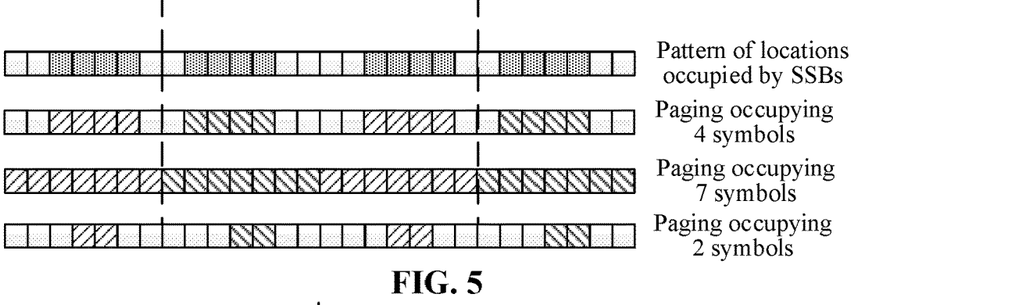
FIG. 5 is a schematic diagram of a relationship between a candidate position of SSBs and a possible position of paging or broadcast message according to an embodiment of the disclosure.
Figure 6:
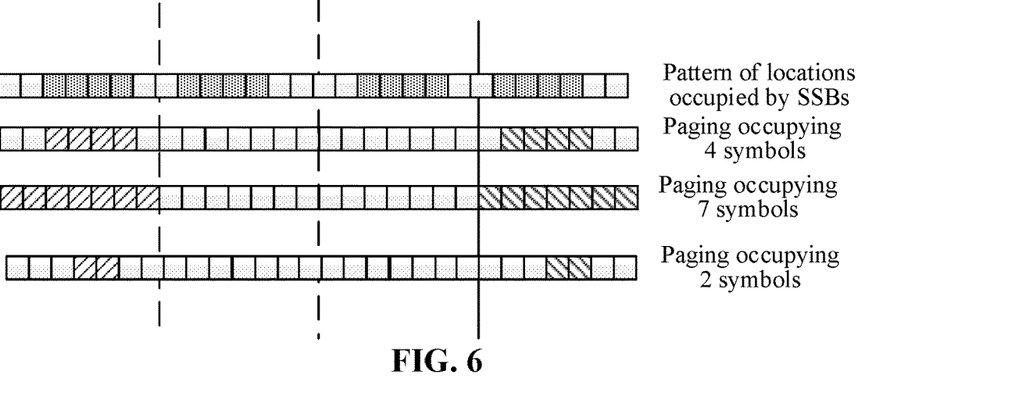
FIG. 6 is a schematic diagram of a relationship between an actual transmitting position of SSBs and an actual occupation position of paging or broadcast message according to an embodiment of the disclosure.

Although FIG. 5 and FIG. 6 mainly illustrate the case where performing paging or transmitting the broadcast message occupies 2 symbols, 4 symbols and 7 symbols, performing paging or transmitting the broadcast message in the embodiment of the disclosure may also occupy other number of symbols, for example, 5 symbols or 6 symbols.

According to an implementation, for the pattern of the SSBs of 30 KHz, 120 KHZ or 240 KHZ, being limited to the pattern of the SSB, because the symbols of the adjacent candidate positions of the SSBs are consecutive, there may be no more than 4 symbols for paging transmission or the transmission of the broadcast message. A superior number of symbols for the paging transmission or the transmission of the broadcast message is 4.

According to an implementation, with respect to the beam of each SSB, the transmission time length of performing paging or transmitting the broadcast message is the time length corresponding to 2 symbols, 4 symbols, 7 symbols or one time slot. Preferably, when the transmission time length of performing paging or transmitting the broadcast message is 2 symbols and 4 symbols, paging is performed or the broadcast message is transmitted in the symbols occupied by the SSB, and paging or transmitting the broadcast message is multiplexed in a frequency division multiplexing manner with the SSB transmission.

According to an implementation, when a time frame of the paging message overlaps with the periodically transmitted SS burst set, the pattern of the SSBs actually transmitted is used, or else, the pattern of the candidate SSBs may be used.

Except the ways of determining N first time locations introduced above, N first time locations may also be determined in other ways. For example, the N first time locations are determined through a preset pattern of the first time location.

How to determine N first time locations has been introduced above, the specific positions required to be occupied by the N first time locations are elaborated below. It should be understood that the N first time locations introduced below may be determined by using any above optional way.

In an implementation, N time locations are consecutive.

According to an implementation, the N time locations occupy Q time slots, and a start point of the N time locations is the M-th symbol of the first time slot in the Q time slots. Q is an integer greater than or equal to 1, and M is an integer greater than or equal to 1, for example, as illustrated in the first line in FIG. 7.

For example, for paging, from a determined time start point, consecutive arrangement is performed according to the time length of the paging message until the paging corresponding to all the SSBs is transmitted. The determined time start point may be either the start point (namely the first symbol) of the time slot of the PO or an offset start symbol position in the time slot of the PO. The start point may be predetermined by the network and the terminal or informed to the terminal by the network.

Figure 7:
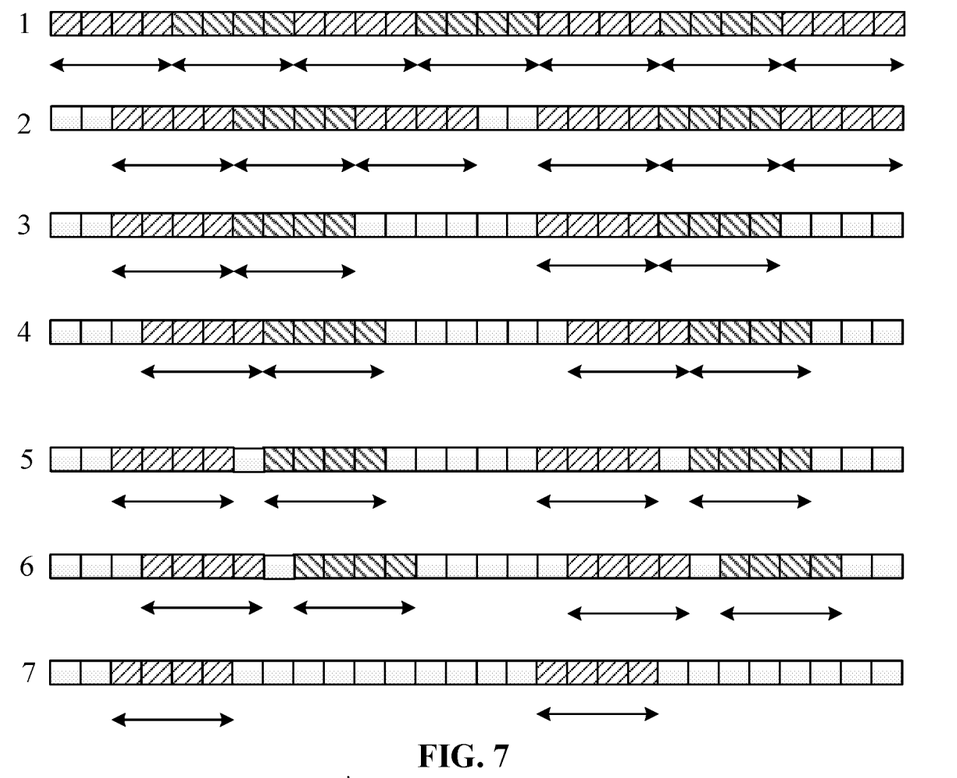
FIG. 7 is a schematic diagram of unknown time for paging or transmitting broadcast message according to an embodiment of the disclosure.

In another implementation, at least two adjacent time locations of the N time locations are inconsecutive, for example, as illustrated in the second line to the seven line in FIG. 7.

According to an implementation, the N time locations occupy R time slots, and each time slot includes T time locations. R is an integer greater than or equal to 1, and T is an integer greater than or equal to 1.

According to an implementation, in each time slot, the start point of the T time locations is the S-th symbol of each time slot. S is an integer greater than or equal to 1, for example, as illustrated in the second line to the seven line in FIG. 7, S is greater than 1.

According to an implementation, in each time slot, an end point of the T time locations is the P-th symbol from the end of each time slot. P is an integer greater than or equal to 1, as illustrated in the third line to the seven line in FIG. 7, P is greater than 1.

According to an implementation, when T is greater than 1, any two of the T time locations are inconsecutive, as illustrated in the fifth line to the sixth line in FIG. 7.

For example, taking paging as an example, from the time start point of the determined PO, the discontinuously arranged K paging messages are transmitted from the M-th symbol in each time slot of the PO according to the time length of the paging message, until the paging corresponding to all the actually transmitted SSBs is transmitted. The adjacent two paging messages may be spaced by N symbols. M may be 1, 2 and 3, N may be 1, 2 and 3, and K is equal to 1 to 3.

According to an implementation, when T is greater than 1, there are at least two consecutive time locations in the T time locations, for example, as illustrated in the second line to the fourth line in FIG. 7.

For example, taking paging for example, from the time start point of the determined PO, the continuously arranged K paging messages are transmitted from the M-th symbol in each time slot of the PO according to the time length of the paging message, until the paging corresponding to all the actually transmitted SSBs is transmitted. The M may be 1, 2 and 3, and K is equal to 1 to 3.

According to an implementation, in the same time slot, there is at least one symbol between the at least two consecutive time locations and the adjacent at least two consecutive time locations, for example, as illustrated in the second line to the fourth line in FIG. 7.

In another implementation, K of the N first time locations at least partially overlap temporally with second time locations of the SSBs. K is an integer greater than or equal to 1, and the second time locations are actual transmission time locations or candidate time locations of the SSBs.

According to an implementation, a single first time location of the K first time locations at least partially overlaps temporally with at most one second time location.

In the implementation, if different second time locations are transmitted through the beams with different set parameters, the single first time location at least overlaps temporally with one second time location, which may avoid performing paging or transmitting the broadcast message on one time location, and change the set parameter for the beam.

According to an implementation, when the number of symbols occupied by one second time location is L times greater than the number of symbols occupied by one first time location, all the symbols occupied by the N first time locations belong to the symbols occupied by the second first time location. L is an integer greater than or equal to 1.

In the implementation, the network device may indicate which second time locations are used for paging the terminal device or transmitting the broadcast message as the first time locations. Indication may be performed by using a way of bit mapping. If the number of the second time locations is also N, N*L bits may be used to indicate which symbols of the second time locations may be used as the first time locations.

It should be understood that symbols of N second time locations, which are used as the first time locations, may also be preset. For example, it may be preset that N positions of N*L positions are used as the first time locations, for example, the first N positions, the latter N positions or any N positions.

Figure 8:
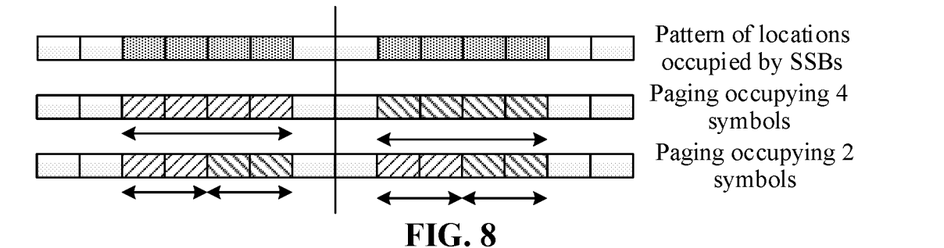
FIG. 8 is a schematic diagram of a relationship between an actual transmitting position of SSBs and an actual occupation position of paging or broadcast message according to an embodiment of the disclosure.

For example, as illustrated in FIG. 8, if there are 4 symbols available for the SSB on each available candidate position of the SSB, when the paging message is transmitted by using 4 symbols, 4 symbols at the SSB position in the distribution pattern of the SSBs in one time slot may be multiplexed. When the paging message is transmitted by using 4 symbols, the available set of 4 symbols in the pattern may be multiplexed; when the paging message is transmitted by using 2 symbols, two times of transmission of the paging messages may multiplex the available set of 4 symbols in the pattern.

According to an implementation, the beams with the same parameter setting are used to page the terminal device or transmit the broadcast message to the terminal device and transmit the SSB respectively at the overlapping part of the first time location(s) and the second time location(s).

According to an implementation, the beams with the same parameter setting are used to page the terminal device or transmit the broadcast message to the terminal device and transmit the SSB respectively at the first time locations and the second time locations that overlap temporally.

According to an implementation, when the first time locations are used for paging, the network device indicates the first time locations by using the RMSI or the OSI or the on-demands information corresponding to the SSBs, or RRC dedicated signaling, and the network device determines the first time locations by using the RMSI or the OSI or the on-demands information corresponding to the SSBs, or RRC dedicated signaling.

According to an implementation, when the first time locations are used for transmitting the broadcast message, the network device indicates the first time location by using the RMSI or the OSI or the on-demands information corresponding to the SSBs, and the terminal device determines the first time location according to the RMSI or the OSI or the on-demands information corresponding to the SSBs.

Therefore, by determining the N first time locations for paging or transmitting the broadcast message at the specific frequency point through the method of the embodiment of the disclosure, the transmission of the paging message or the broadcast message in the NR system may be realized.

Figure 9:
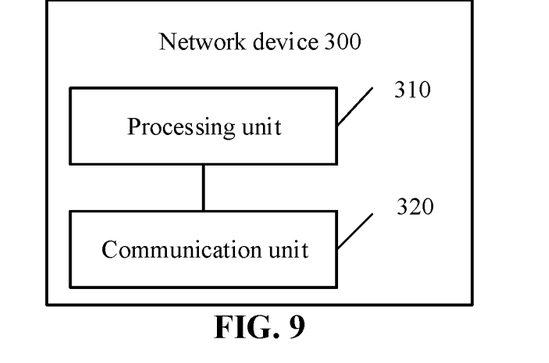
FIG. 9 is a schematic block diagram of a network device according to an embodiment of the disclosure.

FIG. 9 is a schematic block diagram of a network device 300 according to an embodiment of the disclosure. As illustrated in FIG. 9, the network device 300 includes a processing unit 310 and a communication unit 320.

The processing unit 310 is configured to determine N first time locations required to be occupied for paging a terminal device or transmitting the broadcast message to the terminal device at the specific frequency point, N being an integer greater than or equal to 1.

The communication unit 320 is configured to page the terminal device or transmit the broadcast message to the terminal device at the specific frequency point at the N first time locations.

It should be understood that the network device 300 may correspond to the network device in the method embodiment, and may implement corresponding operations implemented by the network device in the method embodiment and, for simplicity, will not be elaborated herein.

Figure 10:
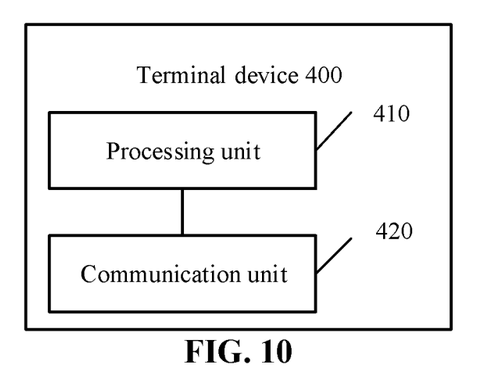
FIG. 10 is a schematic block diagram of a terminal device according to an embodiment of the disclosure.

FIG. 10 is a schematic block diagram of a terminal device 400 according to an embodiment of the disclosure. As illustrated in FIG. 10, the terminal device 400 includes a processing unit 410 and a communication unit 420.

The processing unit 410 is configured to determine N first time locations occupied for the network device to page the terminal device or transmit the broadcast message to the terminal device at the specific frequency point, N being an integer greater than or equal to 1.

The communication unit 420 is configured to monitor paging performed by the network device or the broadcast message transmitted by the network device at the specific frequency point at the N first time locations.

It should be understood that the terminal device 400 may correspond to the terminal device in the method embodiment, and may implement corresponding operations implemented by the terminal device in the method embodiment and, for simplicity, will not be elaborated herein.

Figure 11:
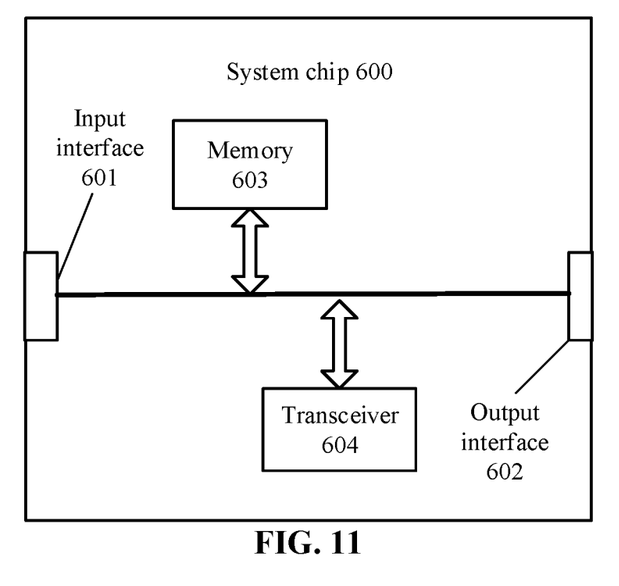
FIG. 11 is a schematic block diagram of a system chip according to an embodiment of the disclosure.

FIG. 11 is a schematic structure diagram of a system chip 600 according to an embodiment of the disclosure. The system chip 600 of FIG. 11 includes an input interface 601, output interface 602, processor 603 and memory 604 which may be connected through an internal communication connecting line. The processor 603 is configured to execute a code in the memory 604.

According to an implementation, when the code is executed, the processor 603 implements the method executed by the network device in the method embodiment. For simplicity, elaborations are omitted herein.

According to an implementation, when the code is executed, the processor 603 implements the method executed by the terminal device in the method embodiment. For simplicity, elaborations are omitted herein.

Figure 12:
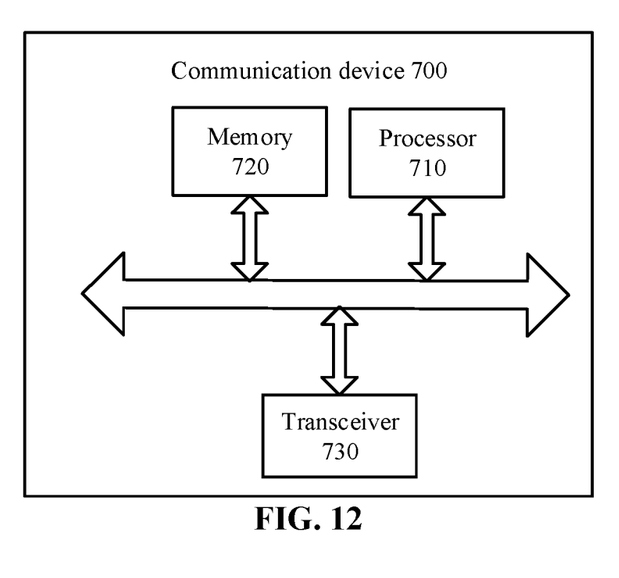
FIG. 12 is a schematic block diagram of a communication device according to an embodiment of the disclosure.

FIG. 12 is a schematic block diagram of a communication device 700 according to an embodiment of the disclosure. As shown in FIG. 12, the communication device 700 includes a processor 710 and a memory 720. Herein, the memory 720 may store a program code, and the processor 710 may execute the program code stored in the memory 720.

According to an implementation, as shown in FIG. 12, the communication device 700 may include a transceiver 730, and the processor 710 may control the transceiver 730 for external communication.

According to an implementation, the processor 710 may call the program code stored in the memory 720 to execute corresponding operations of the network device in the method embodiment. For similarity, elaborations are omitted herein.

According to an implementation, the processor 710 may call the program code stored in the memory 720 to execute corresponding operations of the terminal device in the method embodiment. For similarity, elaborations are omitted herein.

It is to be understood that the processor in the embodiment of the disclosure may be an integrated circuit chip and has a signal processing capability. In an implementation process, each step of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAIVI) and a Direct Rambus RAM (DR RAM). It is to be noted that the memory of a system and method described in the disclosure is intended to include, but not limited to, memories of these and any other proper types.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A wireless communication method, comprising:
determining, by a network device, N first time locations required to be used for paging a terminal device or transmitting a broadcast message to the terminal device at a specific frequency point, the specific frequency point being configured to represent a frequency point at which communication with the terminal device is performed, and N being an integer greater than or equal to 1; and
paging the terminal device or transmitting the broadcast message to the terminal device, by the network device, at the specific frequency point at the N first time locations;
wherein determining, by the network device, the N first time locations required to be occupied for paging the terminal device or transmitting the broadcast message to the terminal device at the specific frequency point comprises:
determining the N first time locations according to actual transmission time locations of Synchronous Signal Blocks (SSBs) at the specific frequency point; and
wherein determining the N first time locations comprises:
determining the N first time locations according to at least one of the following elements indicated by a first pattern: a number of time locations used for signal transmission, a time length occupied by the time locations used for signal transmission, or an allocation of the time locations used for signal transmission, wherein the first pattern is identical to a second pattern, and the second pattern is used for indicating the actual transmission time locations of the SSBs at the specific frequency point.

2. The method of claim 1, wherein when the first time locations are used for paging, a Physical Downlink Control Channel (PDCCH) for paging the terminal device is transmitted at each of the N first time locations.

3. The method of claim 1, wherein the N first time locations are determined according to actual transmission time locations of SSBs.

4. The method of claim 3, wherein the N first time locations are determined according to a predetermined relationship between N second time locations and the N first time locations, wherein the N second time locations are the candidate time locations or the actual transmission time locations of the SSBs.

5. The method of claim 1, further comprising:
when the first time locations are used for paging, indicating the first time locations through Remaining Minimum System Information (RMSI) or Other System Information (OSI) or on-demands system information corresponding to the SSBs, or through Radio Resource Control (RRC) dedicated signaling.

6. A wireless communication method, comprising:
determining, by a terminal device, N first time locations used for a network device to page the terminal device or transmit a broadcast message to the terminal device at a specific frequency point, the specific frequency point being configured to represent a frequency point at which communication with the terminal device is performed, and N being an integer greater than or equal to 1; and
monitoring, by the terminal device, paging performed by the network device or the broadcast message transmitted by the network device at the specific frequency point at the N first time locations,
wherein determining, by the terminal device, the N first time locations occupied for the network device to page the terminal device or transmit the broadcast message to the terminal device at the specific frequency point comprises:
determining the N first time locations according to actual transmission time locations of Synchronous Signal Blocks (SSBs) at the specific frequency point; and
wherein determining the N first time locations comprises:
determining the N first time locations according to at least one of the following elements indicated by a first pattern: a number of time locations used for signal transmission, a time length occupied by the time locations used for signal transmission, or an allocation of the time locations used for signal transmission, wherein the first pattern is identical to a second pattern, and the second pattern is used for indicating the actual transmission time locations of the SSBs at the specific frequency point.

7. The method of claim 6, wherein when the first time locations are used for paging, a Physical Downlink Control Channel (PDCCH) for paging the terminal device is transmitted at each of the N first time locations.

8. The method of claim 6, wherein the N first time locations are determined according to actual transmission time locations of SSBs.

9. The method of claim 8, wherein the N first time locations are determined according to a predetermined relationship between N second time locations and the N first time locations, the N second time locations being the candidate time locations or the actual transmission time locations of the SSBs.

10. The method of claim 6, further comprising: when the first time locations are used for paging, determining the first time locations according to indication from Remaining Minimum System Information (RMSI) or Other System Information (OSI) or on-demands system information corresponding to the SSBs, or indication from RRC dedicated signaling.

11. A network device, comprising a processor and an output interface,
wherein the processor is configured to:
determine N first time locations required to be used for paging a terminal device or transmitting a broadcast message to the terminal device at a specific frequency point, the specific frequency point being configured to represent a frequency point at which communication with the terminal device is performed, and N being an integer greater than or equal to 1; and page the terminal device or transmit the broadcast message to the terminal device, through the output interface, at the specific frequency point at the N first time locations;

wherein the processor is further configured to:

determine the N first time locations according to actual transmission time locations of Synchronous Signal Blocks (SSBs) at the specific frequency point; and wherein the processor is further configured to:

determine the N first time locations according to at least one of the following elements indicated by a first pattern: a number of time locations used for signal transmission, a time length occupied by the time locations used for signal transmission, or an allocation of the time locations used for signal transmission, wherein the first pattern is identical to a second pattern, and the second pattern is used for indicating the actual transmission time locations of the SSBs at the specific frequency point.

12. The device of claim 11, wherein when the first time locations are used for paging, a Physical Downlink Control Channel (PDCCH) for paging the terminal device is transmitted at each of the N first time locations.

13. The device of claim 11, wherein the N first time locations are determined according to actual transmission time locations of the SSBs.

14. The device of claim 13, wherein the N first time locations are determined according to a predetermined relationship between N second time locations and the N first time locations, the N second time locations being the candidate time locations or the actual transmission time locations of the SSBs.

15. The device of claim 11, wherein the output interface is further configured to: when the first time locations are used for paging, indicate the first time locations through Remaining Minimum System Information (RMSI) or Other System Information (OSI) or on-demands system information corresponding to the SSBs, or through Radio Resource Control (RRC) dedicated signaling.

16. A terminal device, comprising a processor and a network interface, wherein the processor is configured to determine N first time locations used for a network device to page the terminal device or transmit a broadcast message to the terminal device at a specific frequency point, the specific frequency point being configured to represent a frequency point at which communication with the terminal device is performed, and N being an integer greater than or equal to 1; and the network interface is configured to monitor paging performed by the network device or the broadcast message transmitted by the network device at the specific frequency point at the N first time locations;

wherein the processor is further configured to:

determine the N first time locations according to actual transmission time locations of Synchronous Signal Blocks (SSBs) at the specific frequency point; and wherein the processor is further configured to:

determine the N first time locations according to at least one of the following elements indicated by a first pattern: a number of time locations used for signal transmission, a time length occupied by the time locations used for signal transmission, or an allocation of the time locations used for signal transmission, wherein the first pattern is identical to a second pattern, and the second pattern is used for indicating the actual transmission time locations of the SSBs at the specific frequency point.

17. The device of claim 16, wherein when the first time locations are used for paging, a Physical Downlink Control Channel (PDCCH) for paging the terminal device is transmitted at each of the N first time locations.

18. The device of claim 16, wherein the N first time locations are according to or actual transmission time locations of SSBs.

19. The device of claim 18, wherein the N first time locations are determined according to a predetermined relationship between N second time locations and the N first time locations, the N second time locations being the candidate time locations or the actual transmission time locations of the SSBs.

20. The device of claim 16, wherein the processor is further configured to: when the first time locations are used for paging, determine the first time locations according to indication from Remaining Minimum System Information (RMSI) or Other System Information (OSI) or on-demands system information corresponding to the SSBs, or indication from RRC dedicated signaling.

* * * * *